US010012323B2

(12) United States Patent
Stradella

(10) Patent No.: US 10,012,323 B2
(45) Date of Patent: Jul. 3, 2018

(54) AUTOMATIC ADJUSTABLE OVERPRESSURE AND MANUAL EXHAUST VALVE FOR DIVING DRY-SUITS

(76) Inventor: Rita Stradella, Camogli (IT)

(*) Notice: Subject to any disclaimer, the term of this patent is extended or adjusted under 35 U.S.C. 154(b) by 509 days.

(21) Appl. No.: 14/893,972

(22) PCT Filed: May 30, 2012

(86) PCT No.: PCT/EP2012/060189
§ 371 (c)(1),
(2), (4) Date: Mar. 21, 2016

(87) PCT Pub. No.: WO2013/178264
PCT Pub. Date: Dec. 5, 2013

(65) Prior Publication Data
US 2016/0223094 A1    Aug. 4, 2016

(51) Int. Cl.
*F16K 15/18* (2006.01)
*B63C 11/08* (2006.01)
*F16K 15/14* (2006.01)

(52) U.S. Cl.
CPC ............ *F16K 15/185* (2013.01); *B63C 11/08* (2013.01); *F16K 15/148* (2013.01)

(58) Field of Classification Search
CPC ....... F16K 15/185; F16K 15/148; B63C 11/08
USPC ................................. 137/854, 522
See application file for complete search history.

(56) References Cited

U.S. PATENT DOCUMENTS 2,386,293 A * 10/1945 Clements ................. A62B 9/02
137/534

3,575,206 A * 4/1971 Ulmann .................. A62B 18/10
128/207.12
4,579,147 A * 4/1986 Davies .................... B63C 11/08
137/854
5,940,878 A    8/1999 Hattori et al.
2007/0095403 A1    5/2007 Su
(Continued)

FOREIGN PATENT DOCUMENTS

JP    2008-265606 A    11/2008
WO    97/00808 A1    1/1997

OTHER PUBLICATIONS

International Search Report for PCT/EP2012/060189 dated Feb. 25, 2013.
(Continued)

*Primary Examiner* — Craig Schneider
*Assistant Examiner* — P. Macade Nichols
(74) *Attorney, Agent, or Firm* — Sughrue Mion, PLLC

(57) ABSTRACT

An automatic adjustable overpressure and manual exhaust valve for diving dry-suits, the valve having a base member with an opening, connected to the dry-suit inner volume, surrounded by an annular sealing surface, an autonomous closing member positioned between the sealing surface and a load transfer member subjected to the load of a pressure setting spring. The valve has a manual control member, axially movable perpendicularly to the opening and interacting with the load transfer member during the manual exhaust phase achieved by the axial movement, towards the dry-suit, of the control member so as to cause the detachment of the load transfer member from the closing member and therefore the removal of the load of the setting spring from the same closing member.

7 Claims, 3 Drawing Sheets

(56) References Cited

U.S. PATENT DOCUMENTS

2011/0284105 A1  11/2011  Lien

OTHER PUBLICATIONS

Written Opinion for PCT/EP2012/060189 dated Feb. 25, 2013.
International Preliminary Report on Patentability for PCT/EP2012/060189 dated Dec. 2, 2014.

* cited by examiner

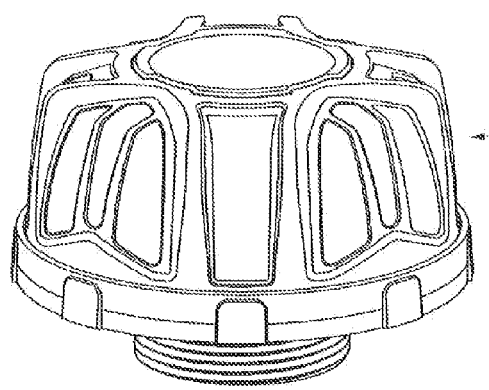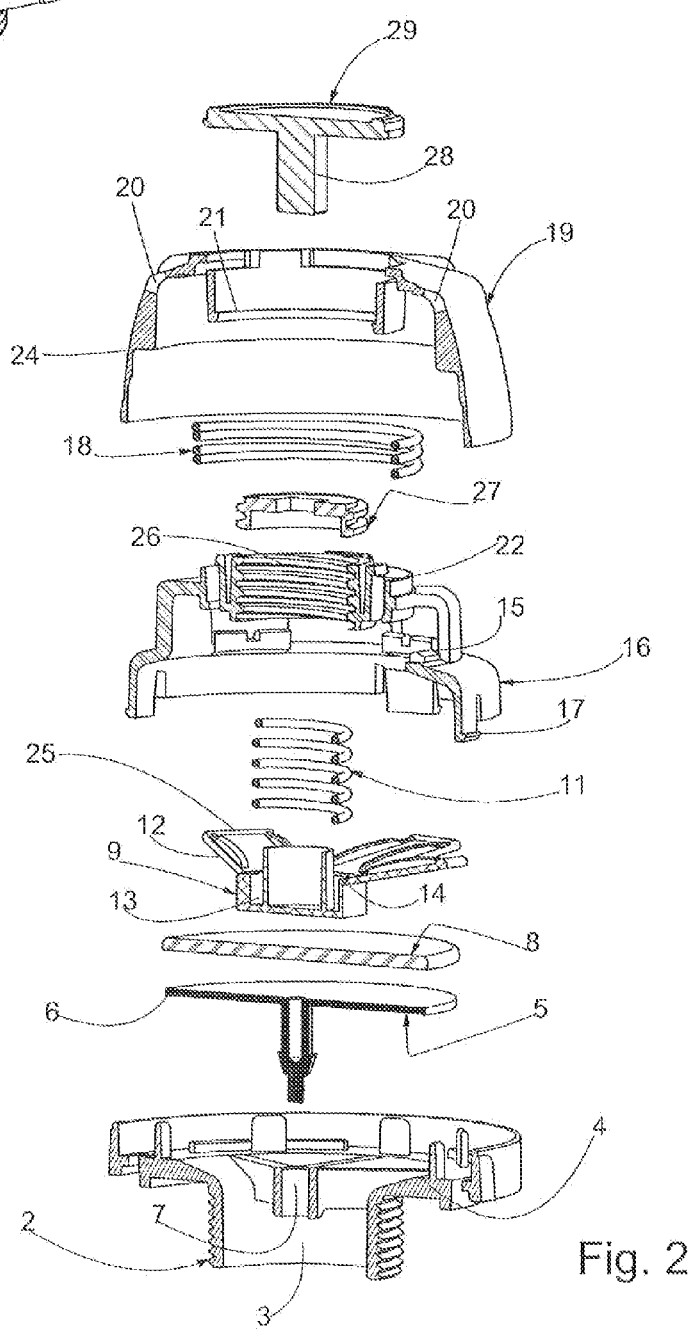
Fig.1
Fig. 2

AUTOMATIC ADJUSTABLE OVERPRESSURE AND MANUAL EXHAUST VALVE FOR DIVING DRY-SUITS

CROSS REFERENCE TO RELATED APPLICATIONS

This application is a National Stage of International Application No. PCT/EP2012/060189 filed May 30, 2012, the contents of which are incorporated herein by reference in their entirety.

The present invention relates to an automatic adjustable overpressure and manual exhaust valve for diving dry-suits.

In a diving dry-suit this type of valve is used, together with a compressed air manual inflation valve, to adjust the volume of the air contained between the suit and the user body.

In a diving dry-suit the air contained between the suit and the user body is used to achieve a thermal insulation and control the hydrostatic buoyancy of the diver.

To facilitate the control of the hydrostatic buoyancy usually the automatic overpressure valves are provided with means to adjust their automatic relief pressure by changing the load of a setting spring acting against a closure element. The relief pressure controls the level, and therefore the volume, of the air staying inside the dry-suit.

In order to better exploit this feature this type of valve is usually placed on the upper part of the arm of the suit, immediately below the shoulder.

In this situation the user, by simple lifting his arm, places the valve into a position which is at a shallower depth than the one of the suit and creates a hydrostatic pressure differential between the inner volume of the suit and the external ambient at the valve outlet which is large enough to overcome the over-pressure setting of the valve. This allows to provide a controlled air outflow and to achieve a fine internal air volume adjustment.

The second essential function of this type of valve is to provide a manual exhaust of the air contained between the suit and the user body. This operation is necessary whenever the automatic overpressure relief is not fast enough. This it could occur during a rapid ascent causing a rapid expansion of the air volume inside the suit or thanks to an excessive air introduction due the inflation valve improper actuation or malfunction (constant free flowing). In both of these cases the manual opening of the valve could represent a real emergency operation and as such it should be performable in the easiest and fastest and most efficient way.

Most of the currently manufactured valves of this type are provided with an elastomeric closure element shaped a thin planar annulus cut from a thin rubber sheet. This closing element is placed, in the closure position, between two displaceable parts, one of which is subjected to the load of the setting spring and the other one is in connection with an external manual control component.

The manual opening of the valve is achieved by pushing the external control component which separates its connected sealing seat part from the elastomeric seal. This separation completely open the valve in both the inlet and outlet flow directions and the valve remains opened until the manual actuation is operated and even if the no more air is inside the suit.

This operation may therefore easily allow a water entrance trough the valve and that requires the use of a second unidirectional internal valve. This second internal valve, is not subjected to the load of any spring and, once the water has filled the cavity above it, may easily allow the water to enter into the suit in the frequent case of very light outward air flows.

This situation, which is first of all unpleasant as it may allow the penetration of very cold water at the arm/shoulder level, might be dangerous in case of diving in contaminated waters which represents one of the most typical use of a dry suit.

Another consequence of the use of a second valve is that the same causes a significant restriction to the outflow of the air which may represent a major safety problem in case of rapid ascent or of malfunction (free-flowing) of the air inlet system.

A different solution is provided by a device described by the Japanese patent with publication N° JP2008265606A which uses a lateral sliding element and an inclinated plane to directly take the closure element away from its closure seat winning the load of the set spring.

This solution causes several problems. The first one is that the manual opening of the valve is achieved with a transverse operation with a unique and preset angle of direction on a relatively small button which significantly limits the easy and quick possibility of an instinctive actuation which is needed in case of emergency. Another problem is that the closure element is displaced from its position of maximum efficacy with the consequent possibility of water penetration described above and the need of use of a second unidirectional valve.

An object of the present invention is to provide an automatic adjustable overpressure and manual exhaust valve for diving dry-suits that does not reproduce the above mentioned problems.

An object of the present invention is thus to provide an automatic adjustable overpressure and manual exhaust valve for diving dry-suits that eliminates the risks water penetration during the manual actuation.

Another object of the present invention is to provide an automatic adjustable overpressure and manual exhaust valve for diving dry-suits that allows an easy, rapid and instinctive actuation, Another object of the present invention is to provide an automatic adjustable overpressure and manual exhaust valve for diving dry-suits that allows an increased outflow of air.

Another object of the present invention is to provide an automatic adjustable overpressure and manual exhaust valve for diving dry-suits that is simple and inexpensive to manufacture and to assemble and does not need added valves to provide waterproofness.

To these ends, the present invention provides an automatic adjustable overpressure and manual exhaust valve for diving dry-suits, said valve comprising a base member provided with an opening, connected to the dry-suit inner volume, surrounded by an annular sealing surface, an autonomous closing member positioned between said sealing surface and a load transfer member subjected to the load of a pressure setting spring, said valve further comprising a manual control member, axially movable perpendicularly to said opening and interacting with said load transfer member during the manual exhaust phase achieved by the axial movement, towards the dry-suit, of said control member so as to cause the detachment of the load transfer member from the closing member and therefore the removal of the load of the setting spring from the same closing member.

Advantageously, said load transfer member is provided with at least one displacement member adapted to interact with the control member so as to move the load transfer member in a direction opposite to the direction of movement of said control member during the manual exhaust phase.

Advantageously, said at least one displacement member is formed as a lever, connected by means of a hinge to the body of the load transfer member, having as its fulcrum the edge of a projection formed in a suitable position inside the valve.

Advantageously, said autonomous closing member is constantly positioned against the annular sealing surface of the opening of the base member, so as to act in any situation as a non-return valve and to prevent the ingress of water into the dry-suit.

Advantageously, said autonomous closing member has preferably a disk shape without discontinuities or central openings.

Advantageously, said autonomous closing member is a disk shaped membrane made in elastomeric material.

Advantageously, said autonomous closing member is fixed at its centre to a holding structure formed in the opening connected to the dry-suit inner volume.

Advantageously, said automatic adjustable overpressure and manual exhaust valve for diving dry-suits comprises an adjusting member, placed against the setting spring, whose spring load setting position is manually variable and adjustable during use to adjust the automatic overpressure opening of the valve.

The present invention further provides a diving dry suit wherein its internal volume is connected to an automatic adjustable overpressure and manual exhaust valve for diving dry-suits as described above.

Other characteristics and advantages of the present invention will appear more clearly on reading the following detailed description, with reference to the accompanying drawings, which are given by way of non-limiting example, and in which:

FIG. 1 is a diagrammatic perspective view of an embodiment of an automatic adjustable overpressure and manual exhaust valve for diving dry-suits object of the present invention.

FIG. 2 is a diagrammatic exploded sectioned view of the automatic adjustable overpressure and manual exhaust valve for diving dry-suits object of the present invention.

Figure 3:
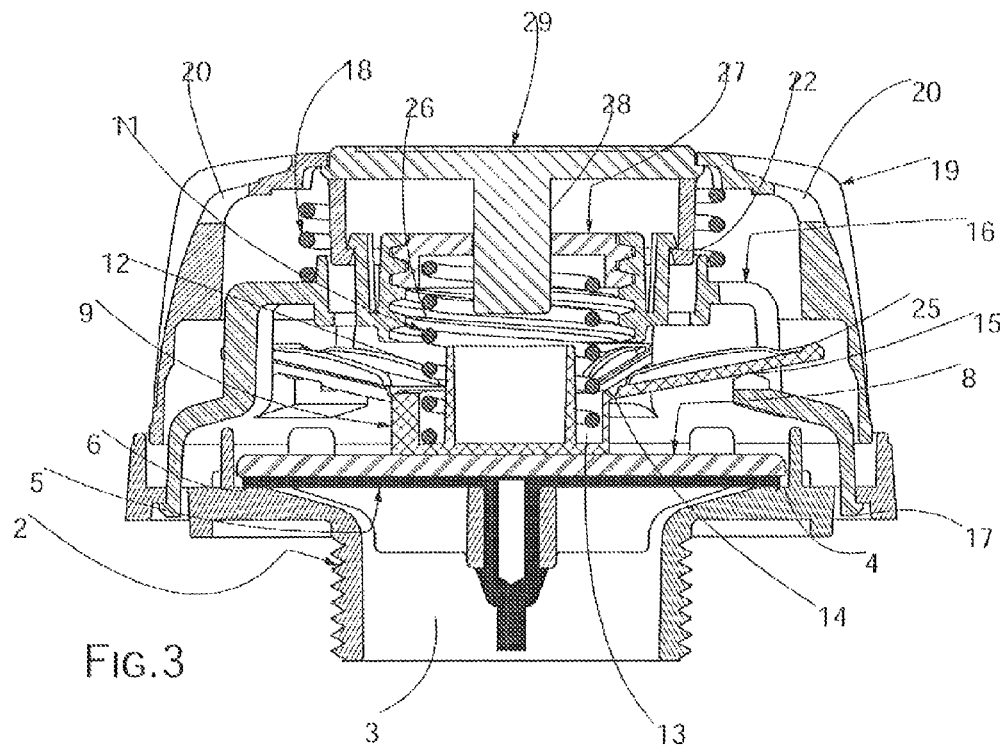
FIG. 3 is a diagrammatic sectioned view of said automatic adjustable overpressure and manual exhaust valve for diving dry-suits in the rest and closure position.

The automatic adjustable overpressure and manual exhaust valve 1 for diving dry-suits in FIG. 1, better shown in FIGS. 2, 3, 4 and 5, comprises a base element 2 provided with an opening 3, communicating with the internal volume of the dry suit, surrounded by an annular sealing surface 4 acting as seal seat for the perimetral edge of a closing member 5 consisting of a disk shaped membrane made of elastomer.

Said membrane 5 is attached with its center to a holding structure 7 formed in the opening 3 of the base 2.

The upper surface of said membrane 5 is in contact with a load transfer device comprising a load distribution element, consisting of a rigid disk 8, and a load transfer element 9.

Said load transfer element 9 comprises a central hollow portion 10, containing the end part of a setting spring 11, resting against the distribution disk 8 and transferring to the same disk the load of the setting spring 11.

Figure 6:
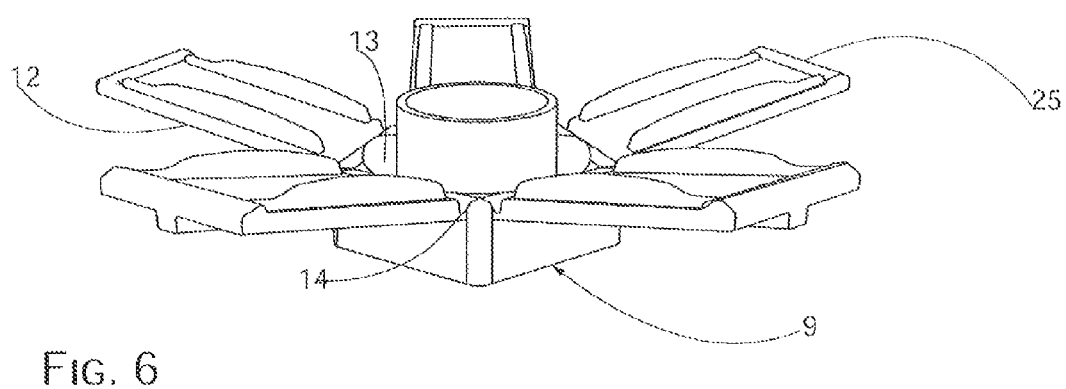
FIG. 6 is a diagrammatic perspective view of a particular component of said automatic adjustable overpressure and manual exhaust valve for diving dry-suits.

Said load transfer element 9, better described in FIG. 6, is further provided with five radial arms 12 connected to its central body part 13 by means of integral plastic hinges 14.

The radial arms 12 act as levers and stand against five raised edges 15 protruding from an internal frame 17 fixed to the base 2 by means of several locking teeth 17.

The valve 1, object of the present invention, further comprises a return spring placed between the frame 16 and an external control cover 19. The external control cover 19 is provided with opening 20, allowing the free venting of the air outflow, and with an annular surface 21 interacting with teeth 22, formed on the internal frame 16, engaging the control cover 19 to the same frame 16 but allowing the free axial movement and the free rotation of said cover 19 in relation to said frame 16 and said base 2.

Said control cover 19 is further provided with an annular planar surface 24 intended to act against the ends 25 of the levers 12 when the control cover 19 is axially pushed towards the dry suit.

The internal frame 16 is further provided with threaded hole 26 into which it is screwed a compression and setting element 27 intended to adjust the compression and the load of the setting spring 11 which is compressed between said setting element 27 and the load transfer element 9.

The setting element 27 is provided with an axial square hole receiving a square stem 28 of a closure cap 29 rigidly locked on the control cover 19 in such a way that the manual rotation of the same control cover 19 causes the screwing (compression of the spring 11) or the unscrewing (release of the spring) of the element 27 on the frame 16.

The control cover 19 and the frame 16 are further both and each provided with a radial interacting stop tooth (not represented) to limit the rotation angle of the control cover 19 in relation to the frame 16.

This limitation determines the height limits of the setting element 27 and therefore the minimum and maximum loads of the spring 11 setting the pressure of the automatic opening of the valve 1 object of the present invention.

In the situation shown in FIG. 3 the valve 1 object of the present invention is in its closure position. The control cover 19 is raised by the return spring 18 and its annular planar surface 24 does not apply any pressure or force on the ends 25 of the arms/levers 12.

The perimetral edge 6 of the membrane 5 is pressed against the annular sealing surface 4 of the base 2, thanks to the load applied by the set spring 11 on the transmission element 9 and therefore on the distribution disk 8, and provides the closure of the valve 1. The closure/opening pressure of the valve 1, and therefore the volume of air maintained inside the dry suit, depend on the load provided by the set spring 11, which, as seen, may be adjusted by rotating the assembly "cover 19/cap 29/compression element 27" in relation to the "frame 16/base 2" assembly.

Figure 4:
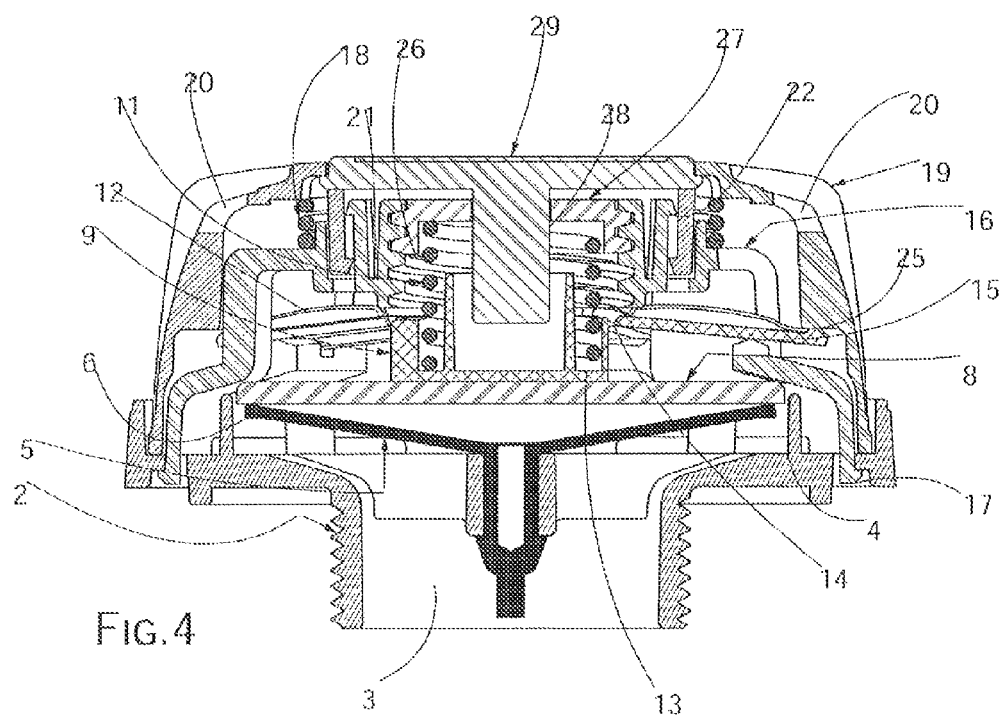
FIG. 4 is a diagrammatic sectioned view of said automatic adjustable overpressure and manual exhaust valve for diving dry-suits in the manual opening position.

FIG. 4 shows the manual opening phase of the valve 1.

During this operation the control cover 19 is axially pushed towards the dry suit and its planar annular surface 24 pushes the ends 25 of the arms/levers 12 forcing them to rotate on their fulcrums consisting of the protruding edges 15 of the frame 16. Thanks to the integral plastic hinges 14 and to the levers 12 proportions, this rotation causes an axial movement perpendicular to the base 2 of the transmission element 9 in a direction which is inverted in relation to the one of the movement of the control cover 19.

This action removes the load of the set spring 11 from the autonomous closing member, or membrane, 5 by detaching the transmission element 9 from the membrane 5 which is then free to flex under then action of the air flowing out of the dry suit.

It is to be noticed that the autonomous closing member or membrane 5 and the annular sealing surface 4 of the base 2 are not directly separated or reciprocally moved by the manual actuation of the user. Their separation is just provided by the air outflow and therefore the membrane 5 returns to its closure position and to work as a unidirectional non-return valve as soon as the air flow ends and even if the manual actuation (push) of the control cover 19 is prolonged.

This eliminates the risks of water penetration and the need of second further non-return valves of the existing devices.

It is also to be noticed that the transmission element 9 is provided with a number of arms/levers 12 (five in the described embodiment) which is enough to evenly distribute the raising thrust of the same transmission element 9.

It is finally to be noticed that thanks to the inverted movement of the transmission element 9 it is possible to achieve the scope of the present invention with the actuation of the valve obtained by pressing its cover in any point towards the user body in an easy, rapid, instinctive and therefore safe way.

Figure 5:
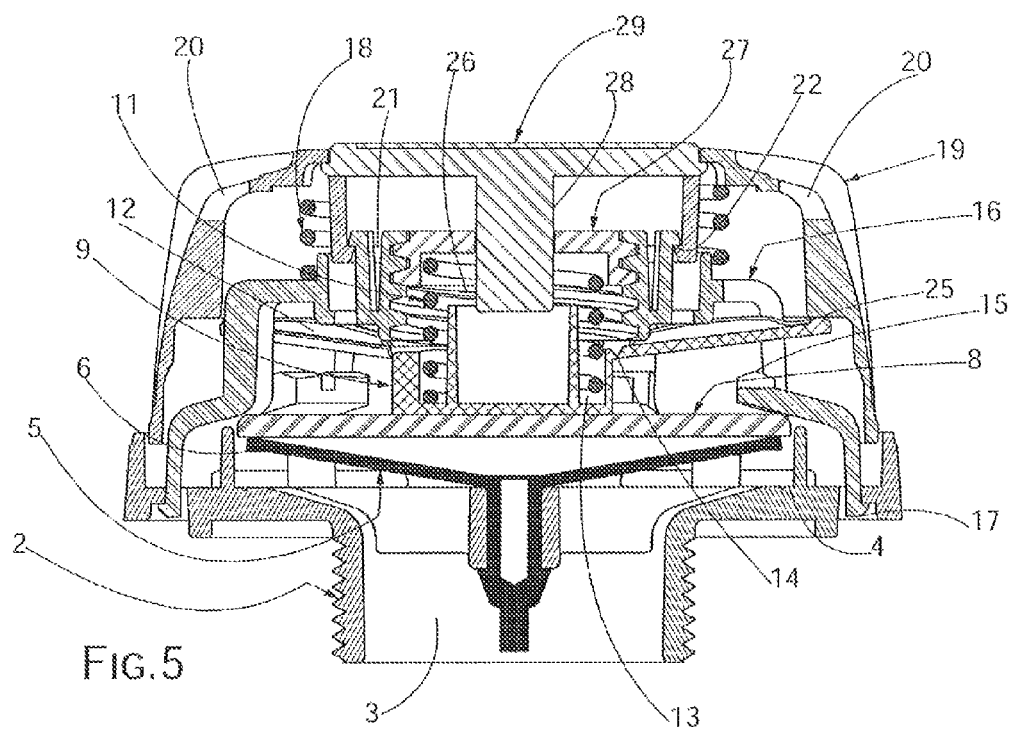
FIG. 5 is a diagrammatic sectioned view of said automatic adjustable overpressure and manual exhaust valve for diving dry-suits in the automatic overpressure opening position.

FIG. 5 shows the valve 1 object of the present invention during its automatic overpressure opening.

In this situation, when the pressure inside the suit applies a force against the membrane 5 which is greater than the load of the set spring 11 the same membrane 5 flexes outward raising the distribution disk 8 and the transmission element 9. It is to be noted that the integral plastic hinges 14 have no effect during this action as their resistance to flex is almost not existent.

Naturally, the various elements described above can be modified by the person skilled in the art, without going beyond the ambit of the present invention as defined by the accompanying claims.

The invention claimed is:

1. An automatic adjustable overpressure and manual exhaust valve for diving dry-suits, said valve comprising a base member provided with an opening, connected to a diving dry-suit inner volume, surrounded by an annular sealing surface, an autonomous closing member positioned between said sealing surface and a load transfer member subjected to a load of a pressure setting spring, said valve further comprising a manual control member, axially movable perpendicularly to said opening and interacting with said load transfer member during a manual exhaust phase achieved by an axial movement, towards the diving dry-suit, of said control member so as to cause the detachment of the load transfer member from the closing member and therefore a removal of the load of the pressure setting spring from the same closing member; and wherein said load transfer member is provided with at least one displacement member adapted to interact with the control member so as to move the load transfer member in a direction opposite to a direction of movement of said control member during the manual exhaust phase.

2. The automatic adjustable overpressure and manual exhaust valve for diving dry-suits according to claim 1, in which said at least one displacement member is formed as a lever, connected by means of a hinge to a body of the load transfer member, having as a fulcrum the edge of a projection formed in a suitable position inside the valve.

3. An automatic adjustable overpressure and manual exhaust valve for diving dry-suits, said valve comprising a base member provided with an opening, connected to a diving dry-suit inner volume, surrounded by an annular sealing surface, an autonomous closing member positioned between said sealing surface and a load transfer member subjected to a load of a pressure setting spring, said valve further comprising a manual control member, axially movable perpendicularly to said opening and interacting with said load transfer member during a manual exhaust phase achieved by an axial movement, towards the diving dry-suit, of said control member so as to cause the detachment of the load transfer member from the closing member and therefore a removal of the load of the pressure setting spring from the same closing member; and wherein said autonomous closing member is constantly positioned against the annular sealing surface of the opening of the base member, so as to act in any situation as a non-return valve and to prevent an ingress of water into the dry-suit.

4. The automatic adjustable overpressure and manual exhaust valve for diving dry-suits according to claim 3, in which said autonomous closing member has a disk shape without discontinuities or central openings.

5. The automatic adjustable overpressure and manual exhaust valve for diving dry-suits according to claim 3, in which said autonomous closing member is a disk shaped membrane made in elastomeric material.

6. The automatic adjustable overpressure and manual exhaust valve for diving dry-suits according to claim 5, in which said autonomous closing member is fixed at a center of said autonomous closing member to a holding structure formed in the opening connected to the dry-suit inner volume.

7. An automatic adjustable overpressure and manual exhaust valve for diving dry-suits, said valve comprising a base member provided with an opening, connected to a diving dry-suit inner volume, surrounded by an annular sealing surface, an autonomous closing member positioned between said sealing surface and a load transfer member subjected to a load of a pressure setting spring, said valve further comprising a manual control member, axially movable perpendicularly to said opening and interacting with said load transfer member during a manual exhaust phase achieved by an axial movement, towards the diving dry-suit, of said control member so as to cause the detachment of the load transfer member from the closing member and therefore a removal of the load of the pressure setting spring from the same closing member; and an adjusting member, placed against the setting spring, and having a spring load setting position that is manually variable and adjustable during use to adjust the automatic overpressure opening of the valve.

* * * * *